No. 706,247. Patented Aug. 5, 1902.
F. W. MARGETTS.
STOPPERING BOTTLES, JARS, OR OTHER VESSELS.
(Application filed Oct. 10, 1901.)
(No Model.)
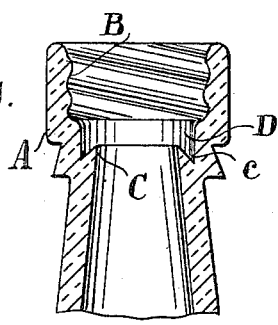
Fig. 1.
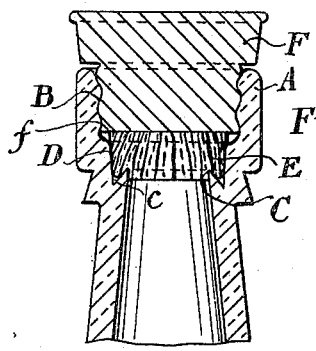
Fig. 2.
Fig. 3.
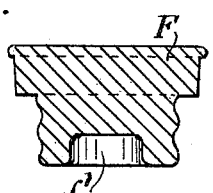
Fig. 4.
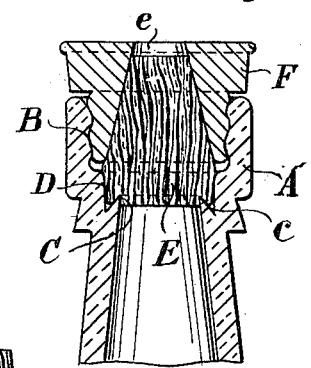
Fig. 5.
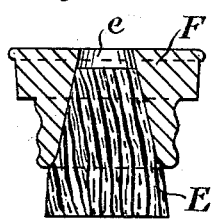
Fig. 6.
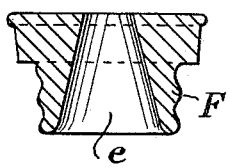
Fig. 7.
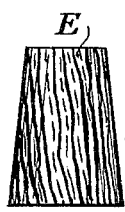
Fig. 8.
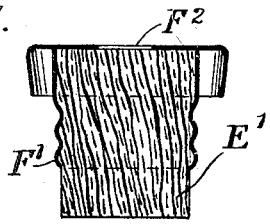
Fig. 10.
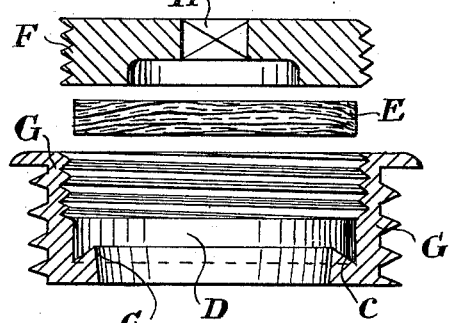
Fig. 9.
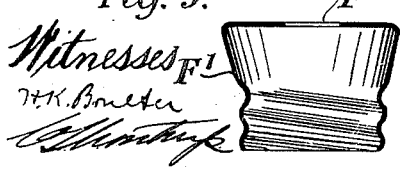
Witnesses
H. K. Bruster
Inventor
Frederick W. Margetts,
By Wm. E. Soulter,
Attorney
THE NORRIS PETERS CO., PHOTO-LITHO., WASHINGTON, D. C.

UNITED STATES PATENT OFFICE.

FREDERICK WILLIAM MARGETTS, OF EAST DULWICH, ENGLAND.

STOPPERING BOTTLES, JARS, OR OTHER VESSELS.

SPECIFICATION forming part of Letters Patent No. 706,247, dated August 5, 1902.

Application filed October 10, 1901. Serial No. 78,261. (No model.)

*To all whom it may concern:*

Be it known that I, FREDERICK WILLIAM MARGETTS, sanitary engineer, a subject of the King of Great Britain, residing at 11 Bawdale road, East Dulwich, in the county of Surrey, England, have invented certain new and useful Improvements in Stoppering Bottles, Jars, or other Vessels, of which the following is a specification.

This invention relates to stoppering bottles, jars, the bung-holes of casks, drums, and other vessels, and has for its object to provide a perfectly air and gas tight joint by means of a screw compressing a washer of cork, woodite, wood, fiber, gutta-percha, or any other suitable compressible material.

To carry out my invention, I form a screw-thread on the interior of the bottle-neck, and at the lower part thereof I form an upwardly-projecting ledge tapering downward toward the sides of the bottle-neck, thereby producing a tapered recess between the edge and the bottle-neck. The stopper is screw-threaded to correspond with the bottle-neck and in one form of my invention screws upon a washer, ring, or disk of cork, wood, woodite, fiber, gutta-percha, or other suitable compressible material and jams same down tightly onto the seating in the bottle-neck. In another form the stopper is provided with a cavity in which is fitted a seating-piece, the lower part being compressed to form a tight joint on the seating. In another form the stopper is provided with an aperture which passes longitudinally therethrough and which is fitted with a seating-piece.

For the bung-fitting of casks, barrels, and the like vessels a boss is made to screw into the wood of the cask in the ordinary way and is internally screw-threaded and fitted with a seating-ledge in the manner described above with reference to a bottle-neck. The stopper or cap is externally threaded to fit the interior of the boss and screws down upon a ring, washer, or disk of cork, fiber, woodite, wood, gutta-percha, or other suitable compressible material.

For removing the stopper or cap a square or other suitable keyhole is made therein in the ordinary way.

In the accompanying drawings, Figure 1 is a vertical section showing a screw-stoppered bottle-neck constructed according to this invention. Fig. 2 shows the same stoppered. Fig. 3 is a vertical section of a modified form of stopper. Fig. 4 is a view similar to Fig. 2, showing a further modified form of stopper. Figs. 5, 6, and 7 are detail views of the stopper shown in Fig. 4. Figs. 8 and 9 are details of another modified form of stopper, and Fig. 10 shows the separate parts of a bung-fitting constructed according to this invention.

In the drawings, A is the bottle-neck, the interior of which is screw-threaded at B, and C is the upwardly-projecting ledge, which, as shown, tapers down inwardly toward the bottle-neck, leaving the tapered recess $c$ between. By an inspection of Figs. 1 and 2 it will be seen that the internal screw-thread B does not extend down to the upwardly-projecting ledge C, but leaves an intervening space D, in which the cork or other washer E is received and tightly compressed between the under surface $f$ of the stopper F and the upwardly-projecting ledge C, which latter thus forms the seating for the washer, ring, or disk E. The wall of the intervening blank part D may be made tapering, as shown, whereby the stopper or washer E will be more tightly wedged in position.

When the stopper F is screwed down, the washer E is not only compressed in the vertical direction onto the seating C, as before stated, but its outer periphery at the bottom is jammed in the space $c$ between the ledge C and the bottle-neck, and a perfectly gas-tight joint is thus made.

In the modification shown in Fig. 3 the mode of stoppering is the same as described with reference to Figs. 1 and 2, the stopper having a cavity $f'$ to receive a correspondingly-shaped projection on the upper face of the washer.

In the further modification shown in Figs. 4 to 7 the stopper F has an aperture $e$ passing longitudinally through it. This aperture $e$ is preferably made tapering largest at the bottom, as shown in Fig. 6, to receive the ordinary tapered cork (shown in Fig. 7) or other suitable disk or washer. Fig. 5 shows the shape the cork would assume when forced into the stopper, and Fig. 4 shows the shape when the stopper is screwed home into position in the bottle-neck.

In the modified form of stopper shown in Figs. 8 and 9 the stopper is made of a shell F', of metal, into which a cork or other washer or disk E' is forced. The top of the shell is either entirely open or, as shown, provided with a small central aperture $F^2$, through which the vessel can be vented, if desired.

In the bung-fitting shown in Fig. 10 G is the boss screwing into the wood of the cask in the ordinary way, and H is a square keyhole for removing the metal or other stopper or cap F. This keyhole H opens through to the under side of the stopper or cap F, so that the bung can be vented through this keyway by boring a hole through the washer E. The other parts correspond to those already described with reference to Figs. 1 and 2.

Having described my invention, what I claim, and desire to secure by Letters Patent, is—

1. A bottle, jar or other vessel having a neck internally screw-threaded and formed with an upwardly-projecting tapering ledge, with a tapering space between the neck-wall and the ledge and an intervening tapering blank part between the lower part of the screw-thread and the ledge, substantially as described.

2. A bottle, jar or other vessel having a neck internally screw-threaded, and formed with an upwardly-projecting tapering ledge, with a tapering space between the neck-wall and the ledge and an intervening blank or straight part between the lower part of the screw-thread and the ledge, a screw-stopper fitting the internal screw-thread on the neck and provided with a longitudinal aperture therethrough containing a cork or other compressible washer which extends below the under surface of the stopper so as take a seating on the ledge on the neck of the bottle or other vessel when the stopper is screwed down, substantially as described and for the purpose stated.

3. In combination with a bottle, jar or other vessel having a neck with an internal screw-thread and a ledge or seat with a space between the neck-wall and the ledge, and an intervening blank or straight part between the lower part of the screw-thread and the ledge, a screw-stopper fitting the internal screw-thread on the neck and provided with a longitudinal aperture therethrough containing a cork or other compressible washer which extends below the under surface of the stopper so as to take a seating on the ledge on the neck of the bottle or other vessel when the stopper is screwed down.

4. In combination with a bottle, jar or other vessel having a neck internally screw-threaded and formed with an upwardly-projecting tapering ledge, with a tapering space between the neck-wall and the ledge and an intervening blank or straight part between the lower part of the screw-thread and the ledge, a screw-stopper fitting the internal screw-thread on the neck, and a compressible washer carried by the said screw-stopper and extending below the under surface of the stopper whereby to take a seating on the ledge on the neck of the bottle, or other vessel when the stopper is screwed down.

5. In combination with a bottle, jar or other vessel having a neck with an internal screw-thread and an upwardly-projecting tapering ledge, with a tapering space between the neck-wall and the ledge, and an intervening tapering blank part between the lower part of the screw-thread and the ledge, a screw-stopper fitting the internal screw-thread on the neck, and a tapering compressible washer carried by the screw-stopper and extending below the under surface of the stopper so as to take a seating on the ledge on the neck of the bottle or other vessel, when the stopper is screwed down and be wedged in position against the tapering wall of the said blank part, substantially as described.

FREDERICK WILLIAM MARGETTS.

Witnesses:
G. D. NEVILLE,
FRED. C. HARRIS.